(12) United States Patent
Rushton et al.

(10) Patent No.: US 12,303,804 B2
(45) Date of Patent: May 20, 2025

(54) FLOW CELL HORN AND METHOD OF TUNING

(71) Applicant: Sonics & Materials, Inc., Newtown, CT (US)

(72) Inventors: Andrew Rushton, New Milford, CT (US); Jeffrey Meyer, Newtown, CT (US); Daniel Grise, Brookfield, CT (US)

(73) Assignee: Sonics & Materials, Inc., Newtown, CT (US)

( * ) Notice: Subject to any disclaimer, the term of this patent is extended or adjusted under 35 U.S.C. 154(b) by 660 days.

(21) Appl. No.: 17/677,342

(22) Filed: Feb. 22, 2022

(65) Prior Publication Data

US 2023/0264116 A1    Aug. 24, 2023

(51) Int. Cl.
*B01J 19/10* (2006.01)
*B01D 11/02* (2006.01)
*G01H 13/00* (2006.01)

(52) U.S. Cl.
CPC ...... *B01D 11/0265* (2013.01); *B01D 11/0288* (2013.01); *B01J 19/10* (2013.01); *G01H 13/00* (2013.01); *B01J 2219/0877* (2013.01)

(58) Field of Classification Search
CPC ..... B01J 19/10; B01J 2219/0899; B06B 3/00; B01D 11/0265; B01D 11/0288
See application file for complete search history.

(56) References Cited

U.S. PATENT DOCUMENTS

| | | |
|---|---|---|
| 3,715,104 A | 2/1973 | Cottell |
| 3,825,481 A | 7/1974 | Supitilov |
| 3,972,614 A | 8/1976 | Johansen et al. |
| 4,016,436 A | 4/1977 | Shoh |
| 4,131,505 A | 12/1978 | Davis, Jr. |
| 4,134,678 A | 1/1979 | Brown et al. |

(Continued)

FOREIGN PATENT DOCUMENTS

| | | |
|---|---|---|
| CA | 2393607 A1 | 6/2001 |
| DE | 29911535 U1 | 9/1999 |
| WO | WO2008080888 A1 | 7/2008 |

OTHER PUBLICATIONS

Emerson Industrial Automation: "Horn Catalog Ultrasonic Horn Catalog 2 Contents"; Sep. 26, 2019, pp. 1-28, XP055903147, Retrieved from the Internet: URL:https://www.emerson.com/documents/auto mation/catalog-ultrasonic-horn-branson-en-us-160126.pdf [retrieved on Mar. 18, 2022].

*Primary Examiner* — Lessanework Seifu
(74) *Attorney, Agent, or Firm* — FORGE IP, PLLC

(57) ABSTRACT

An ultrasonic horn includes a generally cylindrical input section having an energy input end, a generally cylindrical output section having an energy output end, and a throat section disposed between the input section and the output section, the throat section being defined by a side wall having a continuous curve and having a diameter tapering down from a diameter generally equal to a diameter of the input section on a side connected to the input section, and tapering down from a diameter generally equal to a diameter of the output section on a side connected to the output section, to a minimum throat diameter. The minimum throat diameter is smaller than the diameter of the output section and the diameter of the output section is smaller than the diameter of the input section. The side wall of the throat section has a constant radius of curvature.

19 Claims, 4 Drawing Sheets

(56) References Cited

U.S. PATENT DOCUMENTS

| | | | |
|---|---|---|---|
| 4,266,879 | A | 5/1981 | McFall |
| 4,731,227 | A | 3/1988 | Pulvari |
| 4,764,021 | A | 8/1988 | Eppes |
| 5,026,167 | A | 6/1991 | Berliner, III |
| 5,179,923 | A | 1/1993 | Tsurutani et al. |
| 5,386,169 | A | 1/1995 | Dubruque |
| 5,912,182 | A | 6/1999 | Coakley et al. |
| 5,988,396 | A | 11/1999 | Minkara et al. |
| 6,200,486 | B1 | 3/2001 | Chahine et al. |
| 6,257,510 | B1 | 7/2001 | Schuck |
| 7,156,201 | B2 | 1/2007 | Peshkovskiy et al. |
| 7,160,516 | B2 | 1/2007 | Simon et al. |
| 8,651,230 | B2 | 2/2014 | Peshkovsky et al. |
| 2010/0193349 | A1 | 8/2010 | Braam |
| 2020/0129953 | A1 | 4/2020 | Peshkovsky |

FLOW CELL HORN AND METHOD OF TUNING

FIELD OF THE INVENTION

The present invention relates generally to an ultrasonic horn (also known as a probe) for use in connection with liquid processing, and more particularly to such an ultrasonic horn that may be employed in connection with a flow cell through which flows, in a continuous manner, the liquid to be processed.

BACKGROUND OF THE INVENTION

Since its inception over a half century ago, the use of ultrasonics has increased substantially. Originally employed for ultrasonically welding thermoplastic workpieces together, ultrasonics is now also employed for a variety of other purposes, including metal welding, liquid processing, sample preparation, etc.

Also currently undergoing rapid growth is the *cannabis* industry. As the *cannabis* industry has expanded, the share of the market attributed to *cannabis* concentrates (commonly referred to as shatter, budder, or wax) has grown exponentially as positive reviews published in the media by the medical and research communities have highlighted their benefits. These concentrates are significantly more potent, and they provide a purer therapeutic combination of cannabinoids and terpenes. Although, today, smoking the *cannabis* flowers (buds) is still viewed as the traditional mechanism for marijuana consumption, an increasing alternative is the consumption of extracts containing cannabinoids in the form of edibles, sublingual drops, body lotions and vapor inhalation. As the vaporized, smoked, or eaten concentrates ideally have no plant matter left, the resulting flavors are considered cleaner and more pleasant by many.

Ultrasonic-assisted extraction is an effective and rapid technique for extracting *cannabis* concentrates, among others. It improves the diffusion process by accelerating mass transfer within the plant materials, causing the cell walls to rupture and to release the desired compounds.

A vibrating ultrasonic probe immersed in a liquid will transmit alternating high and low pressure waves. These fluctuations cause the liquid molecular cohesive forces to break-down, pulling apart the liquid and creating millions of micro-bubbles (cavities), which expand during the low pressure phases and implode violently during the high pressure phases. As the bubbles collapse, millions of microscopic shock waves, micro jet streams, and eddies are generated at the implosion sites and propagated to the surrounding medium. Although this phenomenon, known as cavitation, lasts but a few microseconds, and the amount of energy released by each individual bubble is minimal, the cumulative amount of energy generated by the imploding cavities is extremely high, thus promoting surface peeling, erosion, and particle breakdown. By disrupting the cell in this manner, solvent penetration is enhanced, accelerating the release of bioactive compounds and other components from the biological matrix into the extraction medium. Because focused ultrasound extraction provides more than 100 times the radiated energy generated in an ultrasonic bath, it is ideally suited for the extraction of beneficial cannabinoid.

When extracted properly, the resulting concentrate is reminiscent of the *cannabis* strain it was extracted from—the taste, smell and effects are simply amplified due to a larger concentration by weight. On average, *cannabis* plant buds will yield about 15% of extracted concentrate. As expected, the quality of the extract and bioavailability will greatly depend on the amount and potency of the plant matter/trichrome (the crystalline hair-like structures coating the outside surface of the flowers) used.

Numerous benefits have been recognized in connection with ultrasound-assisted extraction, as opposed to extraction systems and methods not employing ultrasound, including:
  lowered costs;
  higher yields;
  the ability to employ a wide range of solvents;
  more rapid, safe and efficient processing;
  lower energy consumption;
  the neutralization of bacteria, mold and fungi from extracted material;
  the fact that terpenes and cannabinoids are not denatured;
  increased solute extraction in a shorter time and at lower temperature; and
  reduced thermal degradation of sensitive aromas and flavors.

It will be recognized that a variety of ultrasonic liquid processors are known, including those that satisfy the low volume requirements of the laboratory, as well as large scale continuous flow-through systems to satisfy the high volume requirements of full scale production. The volume of material that can be processed effectively with an ultrasonic processor is dependent on the power rating of the ultrasonic generator (power supply), and the diameter of the probe used with that power supply—the higher the rating of the power supply and the larger the diameter of the probe, the larger the volume of material which can be processed.

For example, it has been found that satisfactory results for processing discrete batches between 10 ml and 4 liters can be achieved using a 500 watt ultrasonic generator (for example, a Model VCX500 ultrasonic generator distributed by Sonics & Materials, Inc. of Newtown, Connecticut). For larger volumes—up to 80 liters/hour or even higher on a flow-through basis—satisfactory results have been achieved using a 1500 watt flow-through system (for example, a Model VCX1500 system distributed by Sonics & Materials, Inc. of Newtown, Connecticut). Moreover, with respect to the latter example, by removing the probe from the flow cell and using it in conjunction with a slow speed mechanical blender, the same equipment can be used to process batches of up to 20 liters or more.

The ultrasonic horn of the present invention is particularly adapted, and well suited, for use in connection with larger-volume applications relying on a flow-through process employing a flow cell, although it should be recognized that it may find use in other types of applications as well.

Also as will be recognized by those familiar with the technology, the particular configuration and properties of the horn will often be dependent upon the extraction liquid employed as part of the extraction process. For example, although a variety of liquids can be used for *cannabis* extraction, a common one is a mixture of 80% ethanol or polyethylene glycol (PEG), 15% water and 5% non-ionic surfactant, such as 2-[4-(2,4,4-trimethylpentan-2-yl)phenoxy]ethanol (distributed by The Dow Chemical Company under the name Triton™ X-100 surfactant). The ultrasonic horn of the present invention is particularly adapted and well suited for use with this extraction liquid, although it is contemplated that the inventive horn may also be suitable for use with other extraction liquids.

The present invention, therefore, aims to provide an ultrasonic horn particularly well suited for use in connection with a flow cell as part of a flow-through method of liquid processing, and which is particularly well-suited for use in connection with extraction liquids appropriate for *cannabis* extraction techniques.

SUMMARY OF THE INVENTION

In accordance with one aspect of the present invention, an ultrasonic horn includes a generally cylindrical input section having a diameter (DI), a length (LI) and an energy input end adapted to be operably connected to an ultrasonic converter or booster, the energy input end including a generally flat surface, a generally cylindrical output section having a diameter (DO), a length (LO) and a free end defining an energy output end, including a generally flat surface, and a throat section disposed between the input section and the output section, the throat section being defined by a side wall having a continuous curve and having a diameter tapering down from a diameter generally equal to the diameter (DI) of the input section on a side connected to the input section, and tapering down from a diameter generally equal to the diameter (DO) of the output section on a side connected to the output section, to a minimum throat diameter (DT). The minimum throat diameter (DT) is smaller than the diameter (DO) of the output section and the diameter (DO) of the output section is smaller than the diameter (DI) of the input section. The side wall of the throat section has a constant radius of curvature (R).

In some embodiments, the energy input end of the input section further comprises a threaded bolt or stud adapted for connection to the converter or booster.

In some embodiments, the input section further comprises a mounting flange adapted for connection to a flow cell housing. In certain of these embodiments, a diameter (DF) of the mounting flange is between 1.795 and 1.805 inches (between 45.593 and 45.847 mm) and the length (LF) of the mounting flange is between 0.095 and 0.105 inches (between 2.413 and 2.667 mm). In certain embodiments, a distance (F) between the mounting flange of the input section and the energy output end of the output section is between 2.120 and 2.130 inches (between 53.848 and 54.102 mm).

In some embodiments, the diameter (DI) of the input section is between 1.545 and 1.555 inches (between 39.243 and 39.497 mm) and the length (LI) of the input section is between 2.870 and 2.880 inches (between 72.898 and 73.152 mm).

In some embodiments, the diameter (DO) of the output section is between 1.495 and 1.505 inches (between 37.973 and 38.227 mm) and the length (LO) of the output section is between 0.295 and 0.305 inches (between 7.493 and 7.747 mm).

In some embodiments, the throat section has no portion thereof that is cylindrical. In some embodiments, the only cylindrical portions of the horn are the input section and the output section.

In some embodiments, the minimum throat diameter (DT) of the throat section is between 0.675 and 0.685 inches (between 17.145 and 17.399 mm). In some embodiments, the constant radius of curvature (R) of the side wall of the throat section is between 0.615 and 0.625 inches (between 15.621 and 15.875 mm).

In some embodiments, an overall length (L) of the horn is between 4.345 and 4.355 inches (between 110.363 and 110.617 mm). In some embodiments, the horn is configured to operate at a frequency falling between 19.95 kHz and 20.05 kHz. In some embodiments, the horn is configured to operate with a maximum amplitude at the energy output end of the output section of between 95-105 microns.

In some embodiments, the horn has a gain falling within the range of 2.93 to 3.13. In certain of these embodiments, the horn has a gain of about 3.03. In some embodiments, the horn is constructed of titanium.

In accordance with another aspect of the present invention, a flow cell assembly includes a housing defining a flow chamber, the housing comprising an inlet and an outlet through which a liquid to be processed is flowed, an ultrasonic horn according to the above-described invention disposed within the housing such that at least the energy output end of the output section is immersed in the liquid to be processed, and a converter operably connected to the horn, the converter causing ultrasonic vibration of the horn.

In some embodiments, a booster is operably disposed between the converter and the horn. In some embodiments, the liquid to be processed comprises a *cannabis* extraction liquid. In certain of these embodiments, the liquid to be processed comprises a mixture of about 80% ethanol or polyethylene glycol (PEG), about 15% water and about 5% non-ionic surfactant. In certain of these embodiments, the non-ionic surfactant comprises 2-[4-(2,4,4-trimethylpentan-2-yl)phenoxy]ethanol.

In accordance with yet another aspect of the present invention, a method is provided for tuning a horn comprising a generally cylindrical input section having an energy input end adapted to be operably connected to an ultrasonic converter or booster and a mounting flange adapted for connection to a flow cell housing, a generally cylindrical output section having a free end defining an energy output end, and a throat section disposed between the input section and the output section, the throat section being defined by a side wall having a continuous curve. The inventive method comprises the steps of: (a) analyzing a frequency of the horn and determining whether the analyzed frequency of the horn falls within an acceptable range; (b) if the analyzed frequency falls outside the acceptable range, milling a face of the output end; (c) repeating steps (a) and (b) until the analyzed frequency falls within the acceptable range; (d) milling a side of the mounting flange facing the energy output end until a distance (F) between the mounting flange and the energy output end fall within an acceptable range; and (e) milling a side of the mounting flange facing the energy input end until the mounting flange has a length (LF) falling within an acceptable range.

Other features and advantages of the invention will become more apparent from consideration of the following drawing.

DETAILED DESCRIPTION OF THE INVENTION

Figure 1:
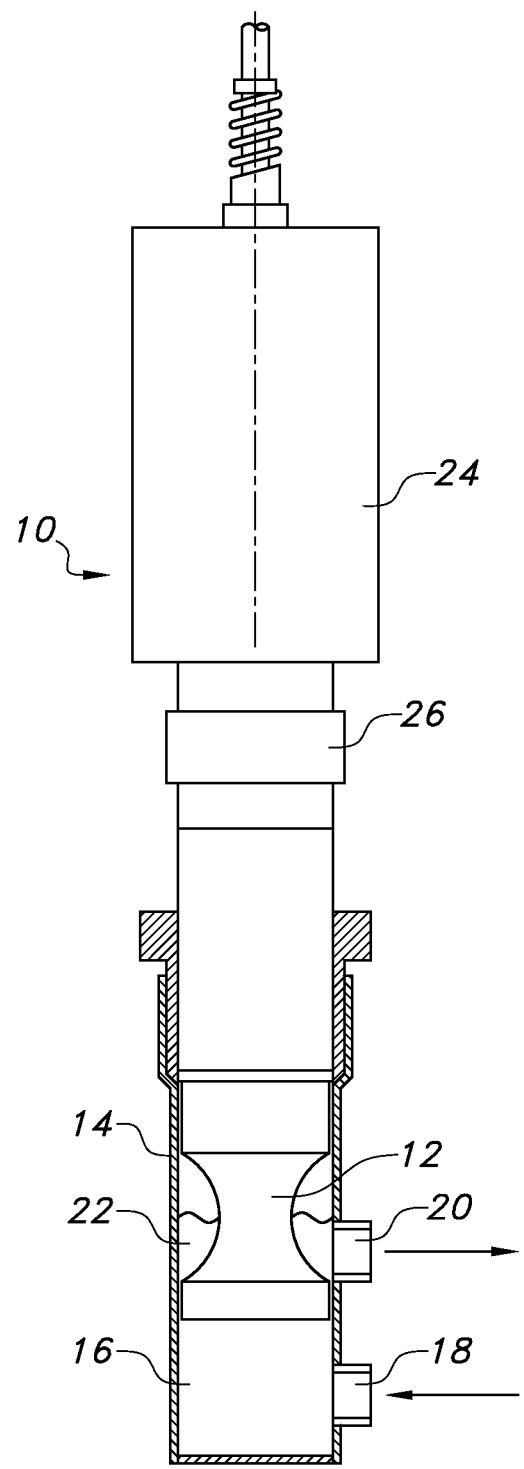
FIG. 1 is a side, partially cross-sectional view showing a flow cell incorporating a flow cell horn in accordance with an exemplary embodiment of the present invention.

FIG. 1 illustrates an exemplary flow cell assembly (10) having a generally conventional configuration, employing a flow cell horn (12) configured in accordance with an exemplary embodiment of the present invention. The flow cell assembly (10) includes a housing (14) which defines a flow chamber (16). Housing (14) also includes an inlet (18) and an outlet (20) through which a liquid (22) to be processed is flowed (indicated by arrows). By varying the rate at which liquid (22) is flowed into and out of chamber (16) the level of liquid (22) within chamber (16), as well as the amount of time it spends within flow chamber (16), can be controlled. The end of horn (12) is immersed in liquid (22), and horn (12) is ultrasonically vibrated.

Liquid (22) flows in front of horn (12) and is circulated through flow chamber (16). Due to the nature of the ultrasonic vibrations and the configuration of horn (12), the ultrasonic energy is generally concentrated at the tip of horn (12). However, ultrasonic energy is not limited to this area, and in fact, some degree of ultrasonic energy can be imparted to liquid (22) in substantially any area where liquid (22) contacts a surface of horn (12).

More specifically, an ultrasonic power supply (not shown) converts typical AC electricity to high frequency electrical energy. This electrical energy is transmitted to a piezoelectric transducer within a converter (24), where it is changed to mechanical vibrations in the ultrasonic range. The ultrasonic vibrations are intensified by horn (12) and focused at the tip. The ultrasonic activity of horn (12) imparts the vibration energy to liquid (22), thereby accomplishing the desired result within flow chamber (16). As these processes are well known, more detail is not provided herein.

Although optional, if desired, a booster (26) may be disposed between the converter (24) and the horn (12), as is well-known. As will be understood, the power supply (not shown), converter (24), booster (26) and horn (12) may be configured in order to achieve a desired maximum amplitude at the tip of the horn (12). Also, as will be understood, the desired maximum amplitude may be at least partially dependent upon the liquid (22) flowing through the flow chamber (16).

For example, and as discussed above, in the case of *cannabis* extraction, a common extraction liquid is a mixture of 80% ethanol or polyethylene glycol (PEG), 15% water and 5% non-ionic surfactant, such as 2-[4-(2,4,4-trimethyl-pentan-2-yl)phenoxy]ethanol (distributed by The Dow Chemical Company under the name Triton™ X-100 surfactant). When such is the case, it has been found that providing a maximum amplitude at the tip of horn (12) of between 95-105 microns provides excellent results. As is known, however, the power supply may be provided with the ability for user adjustability, such that the user may reduce the amplitude by lowering the power setting on the power supply. Nevertheless, what is meant by providing a maximum amplitude at the tip of horn (12) of between 95-105 microns, is that when the power supply is set to 100% power (if provided with an adjustable power setting), the amplitude at the tip of horn (12) is between 95-105 microns.

Also as discussed above, it has been found that for larger volume, flow-through applications (such as employing the flow cell assembly (10) shown in FIG. 1), satisfactory results have been achieved using a 1500 watt power supply/converter system (for example, a Model VCX1500 system distributed by Sonics & Materials, Inc. of Newtown, Connecticut). When such a system is used, it has also been found that employing a booster (26) having a gain of 2 (i.e., an amplitude doubling booster) provides excellent results. When such is the case, it has been found that configuring the horn (12) so as to have a gain of 3.03±0.1 (i.e., falling within the range of 2.93-3.13) provides excellent results. The particular configuration of exemplary horn (12) is now discussed more fully in connection with FIG. 2.

Horn (12) is configured as a 20 kHz horn and is generally composed of three main sections—a generally cylindrical input section (100), a generally cylindrical output section (102), and a throat section (104) disposed therebetween. The sections are generally machined from a solid piece of material (preferably titanium), as is conventional in the art, although other materials may be employed.

Generally cylindrical input section (100) defines an energy input end (106), comprising a generally flat surface, that may be provided with a threaded bolt or stud (108) for connection to booster (26) and/or directly to converter (24), as is conventional in the art. Input section (100) may also be provided with a mounting flange (110), adapted for connection to the flow cell housing (14), also as is conventional in the art.

Referring again to FIG. 2, the diameter (DI) of the input section (100) is between 1.545 and 1.555 inches (between 39.243 and 39.497 mm), while the diameter (DF) of the mounting flange (110) is between 1.795 and 1.805 inches (between 45.593 and 45.847 mm). The corresponding length (LI) of the input section (100)—not including the threaded bolt or stud (108), if provided—is between 2.870 and 2.880 inches (between 72.898 and 73.152 mm), while the length (LF) of the mounting flange (110) is between 0.095 and 0.105 inches (between 2.413 and 2.667 mm). As noted, except for the threaded bolt or stud (108), if provided, and the mounting flange (110), the input section (100) is generally cylindrical in shape.

Also as noted above, the output section (102) is also generally cylindrical in shape, with a diameter (DO) of the output section (102) being between 1.495 and 1.505 inches (between 37.973 and 38.227 mm). The corresponding length (LO) of the output section (102) is between 0.295 and 0.305 inches (between 7.493 and 7.747 mm). As is conventional, the free end of the output section (102) defines an energy output end (112), comprising a generally flat surface.

The throat section (104) is disposed between the input section (100) and the output section (102), and is defined by a side wall (114) having a continuous curve. While attempts have been made in the past for the throat section to include at least some portion having a generally cylindrical configuration (sometimes referred to as "barbell" type horns), it has been found that such designs may exhibit various disadvantages, such as increased likelihood of failure (i.e., at the point where a curved or tapered sidewall transitions to a cylindrical sidewall) and/or increased difficulties in tuning. As such, the present invention employs a throat section (104) without having any portion thereof that is cylindrical. Stated another way, the only cylindrical portions of the inventive horn (12) are the input section (100) and the output section (102).

Figure 2:
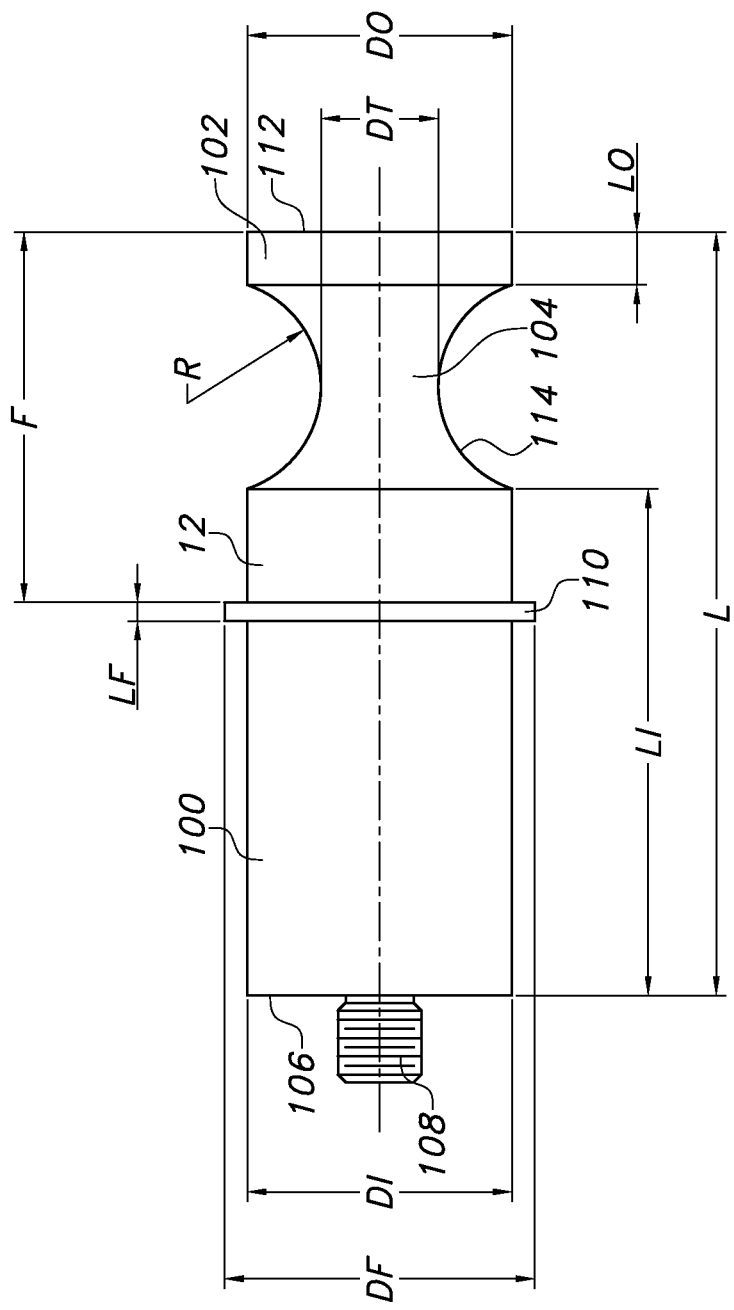
FIG. 2 is a side elevational view of the flow cell horn of FIG. 1, shown in a tuned state.

The throat section (104) tapers down from a diameter between 1.545 and 1.555 inches (between 39.243 and 39.497 mm) on the side connected to the input section (100) and from a diameter between 1.495 and 1.505 inches (between 37.973 and 38.227 mm) on the side connected to the output section (102) to a minimum diameter (DT) of between 0.675 and 0.685 inches (between 17.145 and 17.399 mm). As shown in FIG. 2, the side wall (114) of the throat section (104) has a constant radius of curvature (R) between 0.615 and 0.625 inches (between 15.621 and 15.875 mm).

As can be further seen in FIG. 2, the overall length (L) of the horn (12) of the illustrated exemplary embodiment is between 4.345 and 4.355 inches (between 110.363 and 110.617 mm). Further, it has been recognized that in order to achieve the desired 20 kHz frequency within an acceptable tolerance range (i.e., ±50 Hz)—or stated another way in order to achieve the desired frequency falling between 19.95 kHz and 20.05 kHz—the distance (F) between the mounting flange (110) of the input section (100) and the energy output end (112) of the output section (102) is between 2.120 and 2.130 inches (between 53.848 and 54.102 mm).

By employing the horn configuration shown in FIG. 2, in connection with the flow cell assembly (10) of FIG. 1, with a booster having a gain of 2, the desired frequency falling between 19.95 kHz and 20.05 kHz, along with the desired amplitude at the tip of horn (12) between 95-105 microns, can be attained.

As will be recognized by those skilled in the art, however, a number of factors (such as material characteristics, characteristics of the power supply and/or converter, etc.) may require slight modifications of various dimensions. Thus, rather than employing a "shotgun" approach of varying multiple different dimensions during a tuning process, the present invention employs a very particular process, which begins with an untuned horn (as shown in FIG. 3), and which then employs a particular series of steps in order to achieve acceptable tuning.

Figure 3:
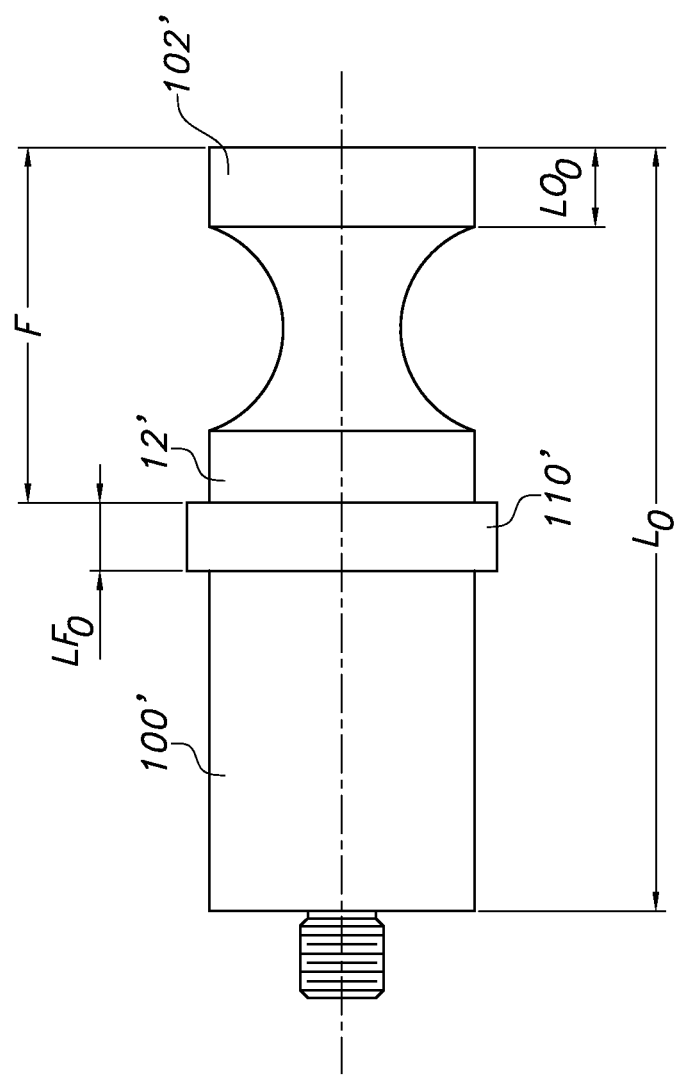
FIG. 3 is a side elevational view of the flow cell horn of FIG. 2, shown prior to undergoing a tuning process according to the present invention.

As can be seen by comparing FIG. 3 (showing an untuned horn (12')) with FIG. 2 (showing the corresponding horn (12) after tuning), it should be noted that a majority of the dimensions remain unchanged during the inventive tuning process. In order to highlight this fact, FIG. 3 only shows dimensions relevant to the tuning process, it being understood that any dimensions not shown in FIG. 3 remain the same as those shown in FIG. 2 and are not changed during the tuning process.

Specifically, prior to tuning, the length ($LO_0$) of the output section (102') in the illustrated example is about 0.500 inches (about 12.7 mm). However, as will be better understood in view of the below discussion of the tuning process, there is nothing particularly critical about this initial dimension, so long as the length ($LO_0$) of the output section (102') prior to tuning is longer than is expected to be the final length (LO) of the output section (102) after tuning, so that the length can be shortened as part of the tuning process (as discussed more fully below).

In view of the larger initial length ($LO_0$) of the output section (102') prior to tuning, it should be recognized that the initial length ($L_0$) of the overall horn (12') prior to tuning—not including the threaded bolt or stud (108), if provided—is correspondingly larger. The initial length ($L_0$) of the overall horn (12') prior to tuning in the illustrated example is about 4.550 inches (about 115.57 mm). However, there is again nothing particularly critical about this initial dimension, so long as the length ($L_0$) of the overall horn (12') prior to tuning is longer than is expected to be the final length (L) of the overall horn (12) after tuning, so that the length can be shortened as part of the tuning process (as discussed more fully below).

As will also be seen by comparing FIG. 3 with FIG. 2, the initial length ($LF_0$) of the mounting flange (110') prior to tuning is larger than the length (LF) of the mounting flange (110) of the tuned horn (12). In the exemplary embodiment shown, the initial length ($LF_0$) of the mounting flange (110') prior to tuning is about 0.400 inches (about 10.16 mm). As above, however, there is nothing particularly critical about this initial dimension, so long as the length ($LF_0$) of the mounting flange (110') prior to tuning is longer than is expected to be the final length (LF) of the mounting flange (110) after tuning, so that the length can be shortened as part of the tuning process (as discussed more fully below).

Additionally, it will be noted that in the illustrated example, the mounting flange (110') of the untuned horn (12') is positioned from the free end of the output section (102') by a distance (F) that the same as the final corresponding distance (F) of the tuned horn (12)—i.e., between 2.120 and 2.130 inches (between 53.848 and 54.102 mm). Although such is not strictly necessary, this configuration ensures the proper positioning of the mounting flange (110) on the tuned horn (12) during the tuning process, as described more fully below.

Figure 4:
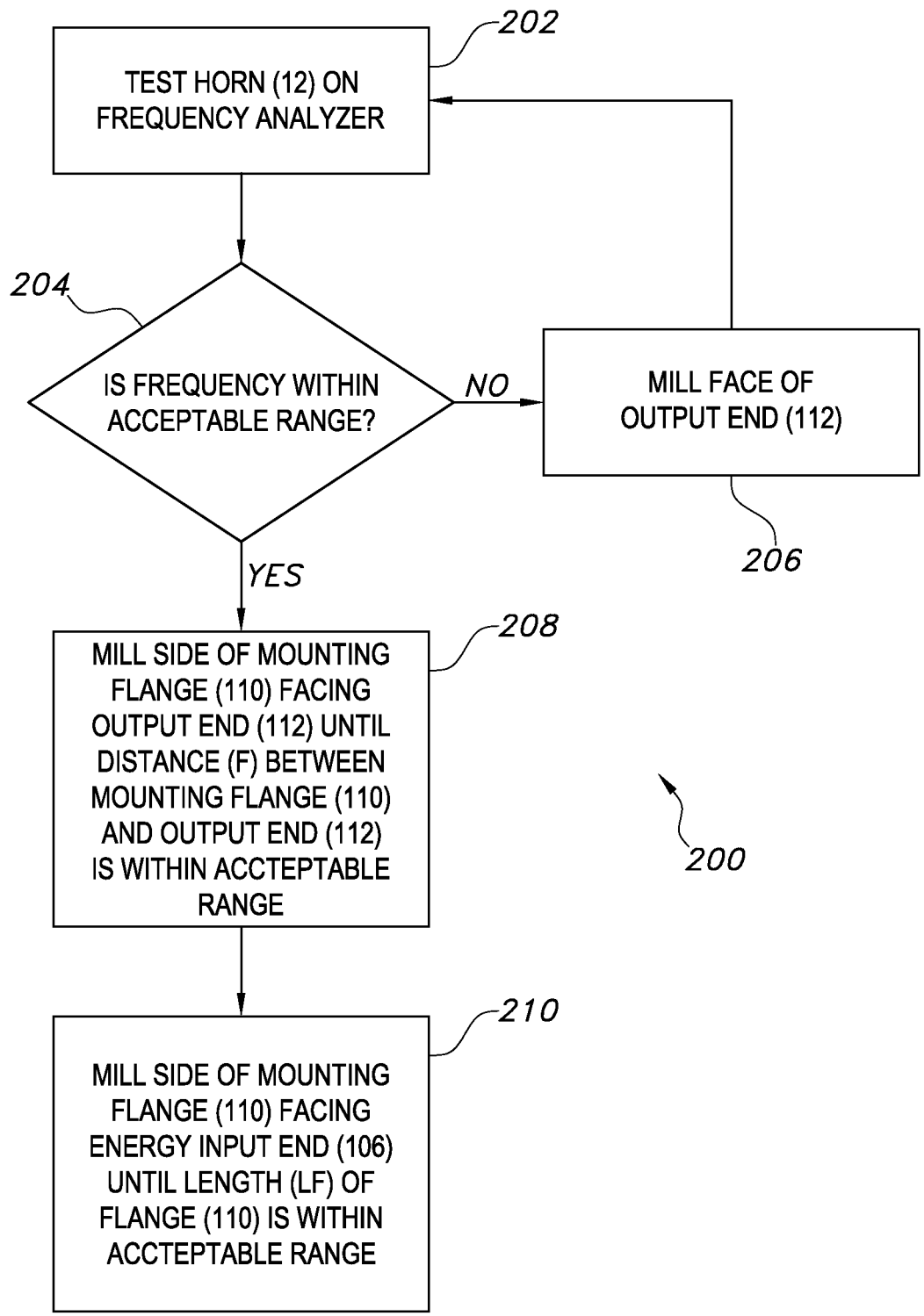
FIG. 4 is a flow chart illustrating an exemplary embodiment of a tuning process according to the present invention, which tuning process can be employed to tune the untuned flow cell horn of FIG. 3, thereby resulting in the tuned flow cell horn of FIG. 2.

Referring now to FIG. 4, shown is a flow chart illustrating an exemplary embodiment of a tuning process (200) according to the present invention, which tuning process (200) can be employed to tune the untuned flow cell horn (12') of FIG. 3, thereby resulting in the tuned flow cell horn (12) of FIG. 2.

At step (202), the untuned horn (12') is disposed on a frequency analyzer and tested in a conventional manner. As such testing devices and methodologies are well known in the art, further details of step (202) are not provided herein.

At step (204) a determination is made as to whether the horn in its current configuration has a frequency falling within a desired range (i.e., 20 kHz±50 Hz—or between 19.95 kHz and 20.05 kHz). If the frequency falls outside the desired range, the face of the output end (112) is milled further at step (206) and then testing is repeated at step (202). This process is repeated until a determination is made at step (204) that the current configuration of the horn (12) has a frequency falling within the desired range.

As noted in connection with the particular exemplary embodiment discussed in detail above, it has been found that milling of the output end (112) until a length (LO) of the output section (102) is between 0.295 and 0.305 inches (between 7.493 and 7.747 mm)—with the corresponding overall length (L) of the horn (12) being within the range of between 4.345 and 4.355 inches (between 110.363 and 110.617 mm)—generally provides the desired frequency, although these particular acceptable lengths depend on various factors.

Due to milling of the output end (112) at step (206), it is likely that the distance (F) between the mounting flange (110) of the input section (100) and the energy output end (112) of the output section (102) is no longer within the desired range—i.e., between 2.120 and 2.130 inches (between 53.848 and 54.102 mm). Thus, once it is determined, at step (204), that the frequency falls within the desired range, such that no further milling of the output end (112) is necessary, the side of the untuned mounting flange (110') facing the output end (112) is milled, at step (208) until the distance (F) between the mounting flange (110) and the energy output end (112) does fall within the desired range—i.e., between 2.120 and 2.130 inches (between 53.848 and 54.102 mm).

Even after milling of the untuned mounting flange (110') at step (208), it is likely that the mounting flange (110)—which originally had a length ($LF_0$) of about 0.400 inches (about 10.16 mm)—still does not have a length (LF) falling within the desired range—i.e., between 0.095 and 0.105 inches (between 2.413 and 2.667 mm). Thus, at step (210), the side of the mounting flange (110) facing the energy input end (106) is milled until the mounting flange (110) does have a length (LF) falling within this desired range.

As should be apparent, the tuned horn (12) does now have the dimensions discussed above in connection with the particular illustrated embodiment. Thus, the tuning process (200) illustrated in FIG. 4 was used to tune the untuned horn (12') illustrated in FIG. 3, thereby resulting in the tuned horn (12) illustrated in FIG. 2.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An ultrasonic horn comprising:
   a generally cylindrical input section having a diameter (DI), a length (LI) and an energy input end adapted to be operably connected to an ultrasonic converter or booster, the energy input end comprising a generally flat surface;
   a generally cylindrical output section having a diameter (DO), a length (LO) and a free end defining an energy output end, comprising a generally flat surface;
   a throat section disposed between said input section and said output section, said throat section being defined by a side wall having a continuous curve and having a diameter tapering down from a diameter generally equal to the diameter (DI) of said input section on a side connected to said input section, and tapering down from a diameter generally equal to the diameter (DO) of said output section on a side connected to said output section, to a minimum throat diameter (DT),
   wherein the minimum throat diameter (DT) is smaller than the diameter (DO) of said output section and the diameter (DO) of said output section is smaller than the diameter (DI) of said input section; and
   wherein the side wall of said throat section has a constant radius of curvature (R).

2. The ultrasonic horn of claim 1 wherein the energy input end of said input section further comprises a threaded bolt or stud adapted for connection to the converter or booster.

3. The ultrasonic horn of claim 1 wherein said input section further comprises a mounting flange adapted for connection to a flow cell housing.

4. The ultrasonic horn of claim 3 wherein a diameter (DF) of the mounting flange is between 1.795 and 1.805 inches (between 45.593 and 45.847 mm) and wherein the length (LF) of the mounting flange is between 0.095 and 0.105 inches (between 2.413 and 2.667 mm).

5. The ultrasonic horn of claim 3 wherein a distance (F) between the mounting flange of said input section and the energy output end of said output section is between 2.120 and 2.130 inches (between 53.848 and 54.102 mm).

6. The ultrasonic horn of claim 1 wherein the diameter (DI) of said input section is between 1.545 and 1.555 inches (between 39.243 and 39.497 mm) and wherein the length (LI) of said input section is between 2.870 and 2.880 inches (between 72.898 and 73.152 mm).

7. The ultrasonic horn of claim 1 wherein the diameter (DO) of said output section is between 1.495 and 1.505 inches (between 37.973 and 38.227 mm) and wherein the length (LO) of said output section is between 0.295 and 0.305 inches (between 7.493 and 7.747 mm).

8. The ultrasonic horn of claim 1 wherein said throat section has no portion thereof that is cylindrical.

9. The ultrasonic horn of claim 1 wherein the only cylindrical portions of said horn are said input section and said output section.

10. The ultrasonic horn of claim 1 wherein the minimum throat diameter (DT) of said throat section is between 0.675 and 0.685 inches (between 17.145 and 17.399 mm).

11. The ultrasonic horn of claim 1 wherein the constant radius of curvature (R) of the side wall of said throat section is between 0.615 and 0.625 inches (between 15.621 and 15.875 mm).

12. The ultrasonic horn of claim 1 wherein an overall length (L) of said horn is between 4.345 and 4.355 inches (between 110.363 and 110.617 mm).

13. The ultrasonic horn of claim 1 wherein said horn is configured to operate at a frequency falling between 19.95 KHz and 20.05 kHz.

14. The ultrasonic horn of claim 1 wherein said horn is configured to operate with a maximum amplitude at the energy output end of said output section of between 95-105 microns.

15. The ultrasonic horn of claim 1 wherein said horn has a gain falling within the range of 2.93 to 3.13.

16. The ultrasonic horn of claim 15 wherein said horn has a gain of about 3.03.

17. The ultrasonic horn of claim 1 wherein said horn is constructed of titanium.

18. A flow cell assembly comprising;
   a housing defining a flow chamber, said housing comprising an inlet and an outlet through which a liquid to be processed is flowed;
   an ultrasonic horn according to claim 1 disposed within said housing such that at least the energy output end of said output section is immersed in the liquid to be processed; and
   a converter operably connected to said horn, said converter causing ultrasonic vibration of said horn.

19. The flow cell assembly of claim 18 further comprising a booster operably disposed between said converter and said horn.

* * * * *